UNITED STATES PATENT OFFICE.

HOOPER B. STRAUT AND CHANCY B. SHUTE, OF CULBERTSON, NEBRASKA, ASSIGNORS OF ONE-THIRD TO H. D. McKELVEY, OF SAME PLACE.

WELDING COMPOUND.

SPECIFICATION forming part of Letters Patent No. 432,497, dated July 15, 1890.

Application filed May 6, 1890. Serial No. 350,300. (No specimens.)

*To all whom it may concern:*

Be it known that we, HOOPER B. STRAUT and CHANCY B. SHUTE, citizens of the United States, residing at Culbertson, in the county of Hitchcock and State of Nebraska, have invented certain new and useful Improvements in Welding Compounds; and we do declare the following to be a full, clear, and exact description of the invention, such as will enable others skilled in the art to which it appertains to make and use the same.

Our invention relates to welding compounds, and has for its object the production of an efficient welding compound adapted to the use of blacksmiths and other metal-workers; and it consists in a composition of ingredients combined, as hereinafter described. It is a well-known fact to those skilled in the art of metallurgy that some such expedient must be resorted to in order to effect a successful union or joining of two pieces of metal by the operation of welding; said operation consisting in a joining so complete as to unite the two parts as one homogeneous mass, the main function of a compound such as ours being to cleanse the abutting parts to be welded by eating the surfaces thereof.

Our compound consists of ingredients which we prefer to combine as follows: borax, one pound; prussiate of potassa, two and one-half ounces; muriate of ammonia, four ounces; soft water, one pint; same to be cooked until crystallized, after which is added four ounces of white chalk.

The above proportions have been demonstrated as the most advantageous and effective, though some variations may be permitted without materially changing the nature thereof.

Having thus described our invention, what we claim is—

1. A welding compound consisting in the combination of borax, prussiate of potassa, muriate of ammonia, water, and chalk, substantially as described.

2. A welding compound consisting in the combination of borax, one pound; prussiate of potassa, two and one-half ounces; muriate of ammonia, four ounces; soft water, one pint; and chalk, four ounces, substantially as described.

In testimony whereof we affix our signatures in presence of two witnesses.

HOOPER B. STRAUT.
CHANCY B. SHUTE.

Witnesses:
J. W. COLE,
H. S. DYER.